United States Patent [19]
Thyselius

[11] 3,934,093
[45] Jan. 20, 1976

[54] TRANSIT EXCHANGE FOR ASYNCHRONOUS DATA WITH UNKNOWN STRUCTURE

[75] Inventor: Per-Olof Thyselius, Tyreso, Sweden

[73] Assignee: Telefonaktiebolaget L M Ericsson, Stockholm, Sweden

[22] Filed: July 24, 1974

[21] Appl. No.: 491,298

[30] Foreign Application Priority Data
Aug. 10, 1973 Sweden .............................. 73109704

[52] U.S. Cl. ............................................. 179/15 BA
[51] Int. Cl.$^2$ ......................................... H04J 3/00
[58] Field of Search ..................... 179/15 BA, 15 A; 340/172.5; 178/50

[56] References Cited
UNITED STATES PATENTS
3,764,989   10/1973   McClellan........................ 340/172.5

Primary Examiner—Ralph D. Blakeslee
Attorney, Agent, or Firm—Hane, Baxley & Spiecens

[57] ABSTRACT

The present invention relates to a transit exchange for the transmission of asynchronous data signals having an unknown character structure and data rate with the aid of a control equipment including a processor and a sampling device which is common to a number of sending terminal equipments and which works on the time multiplex principle. The data signals received on each of a number of incoming lines are sampled at a frequency so selected in relation to the data rate, expressed in unit elements per second, that the number of sampling pulses per unit element of the data signals is not less than the reciprocal value of the permitted relative time distortion. The transit exchange includes an encoder working synchronously with the sampling device which, when detecting a change of value of the data signals, delivers a code word comprising a specific number of bits indicating the time position for the change to an intermediate memory where the code word is stored one bit at a time in an address assigned to the receiving terminal equipment. It further includes a decoding device which, by successive processing of the bits of the code word, forms indication signals which alter their value at time positions corresponding to the code word, and also includes a read-out device which transfers the values of the indication signals to a regeneration device corresponding to the receiving terminal equipment where data signals are formed which change their value in synchronism with the indication signals.

8 Claims, 8 Drawing Figures

TRANSIT EXCHANGE FOR ASYNCHRONOUS DATA WITH UNKNOWN STRUCTURE

The present invention relates to a transit exchange for the transmission of asynchronous data signals with unknown character structure and data rate with the aid of a control equipment operating according to the time division multiplex principle.

According to an earlier known method, described in the Swedish published application No. 347,407, changes of state of incoming data signals, i.e. switching from binary "0" to binary "1" and vice versa, are detected by a receiving line equipment, after which these changes are transferred to a sending line equipment by means of address information stored in a computer. This method is characterized by the fact that the computer used must have a very high processing capacity, as it is used by every data connection during the entire duration of each of the connnections, and by the fact that the switching principle causes some time distortion of the switched data signals owing to the momentary load on the computer, i.e. a random prolongation of individual character elements.

It is conceivable to have the incoming data signals sampled with a density determined by the permitted sampling distortion, of the order of 50–100 times per character element corresponding to 2–1% time distortion, and thereafter to transfer the sampling values to the sending line equipment via a switching network operating in the time division multiplex principle. As, according to this method, every data connection loads the switching network with a very high transmission frequency, a strict limitation is placed on the number of data connections which can be incorporated in one and the same time division multiplex frame. This means that a more complicated switching network, comprising several switching stages, must be adopted even for moderate sizes of exchange.

An object of the invention is to utilize the advantages of such a sampling method as regards the well-controlled time distortion, but to a great extent to reduce the transmission frequency forced on the switching network. This is achieved through the use of a known encoding principle according to which changes of state of incoming data signals detected through the sampling are expressed in a code containing information concerning the time for the change of state in binary form, after which the code word can be transmitted by the switching network at a transmission frequency that is considerably lower than the sampling frequency. The characteristics of the invention appear from the claims.

The invention is explained below by means of an embodiment with reference to the accompanying drawing, in which.

Figure 1:
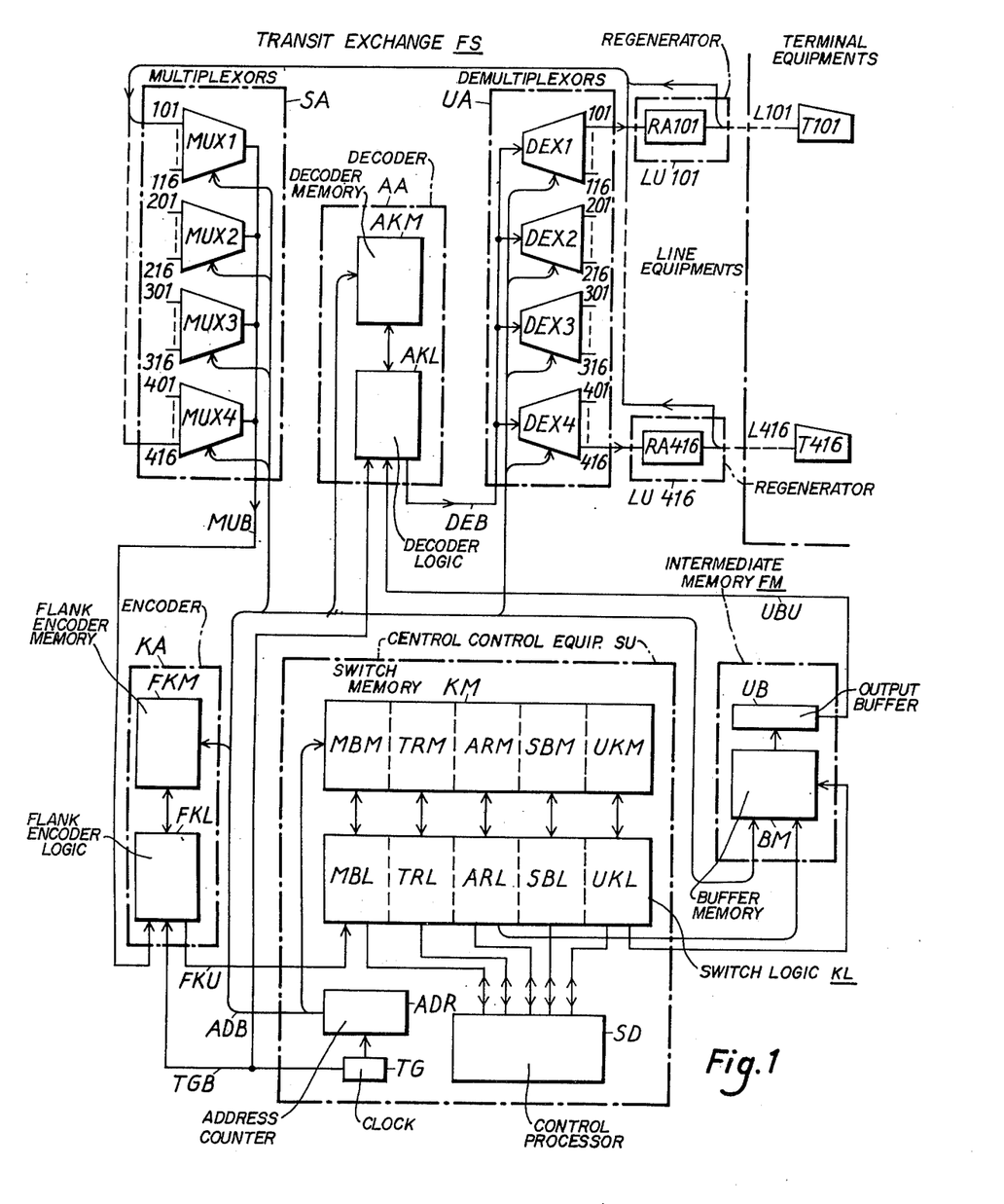
FIG. 1 shows a transit exchange for switching of asynchronous data signals.

FIG. 1 shows a transit exchange FS to which $4 \cdot 16 = 64$ terminal equipments T 101 – 416 are connected on their respective lines L 101 – L 416 and associated line equipments LU 101 – LU 416. The terminal equipments work with varying asynchronous modulation rates, preferentially in the range 50–300 bauds. All terminal equipments, however, are assumed to execute all signalling to the transit exchange, i.e. calling, selection, clearing, with a given speed and with a given character structure in accordance with CCITT's recommendation No. X.1. This entails the use of the speed of 200 bauds and the international alphabet No. 5, i.e. the 7-bit alphabet standardized by CCITT and ISO, with one parity bit, one start bit and two stop bits per character. In a through-connected position the terminal equipments start to send at their own specific data speeds and character structure, both of which are unknown to the transit exchange. The latter must therefore be prepared to transmit each change of state on an incoming line, obtained from a sending terminal equipment, to the corresponding outgoing line for transfer to the receiving terminal equipment in such a way that the time spacing between the changes of state is reproduced with the desired accuracy.

Each of the 16 line equipments, e.g. LU 101 – LU 116, is connected to a multiplexor unit, e.g. MUX 1, and to a demultiplexor unit, e.g. DEX 1, the functions of which are, in selected time slots, to through-connect the line to an incoming bus MUB and to an outgoing bus DEB respectively. The multiplexor units MUX 1–4 together constitute a sampling device SA for the values of the incoming data signals, and the demultiplexor units DEX 1–4 together constitute a read-out device UA for transfer of indication signals relating to the values of the outgoing data signals to a regeneration device RA incorporated in each line equipment, as will be described in greater detail. Apart from the regeneration device, the line equipments contain circuits of conventional kind for translation between the signal representations used on the line and exchange sides respectively.

Figure 2:
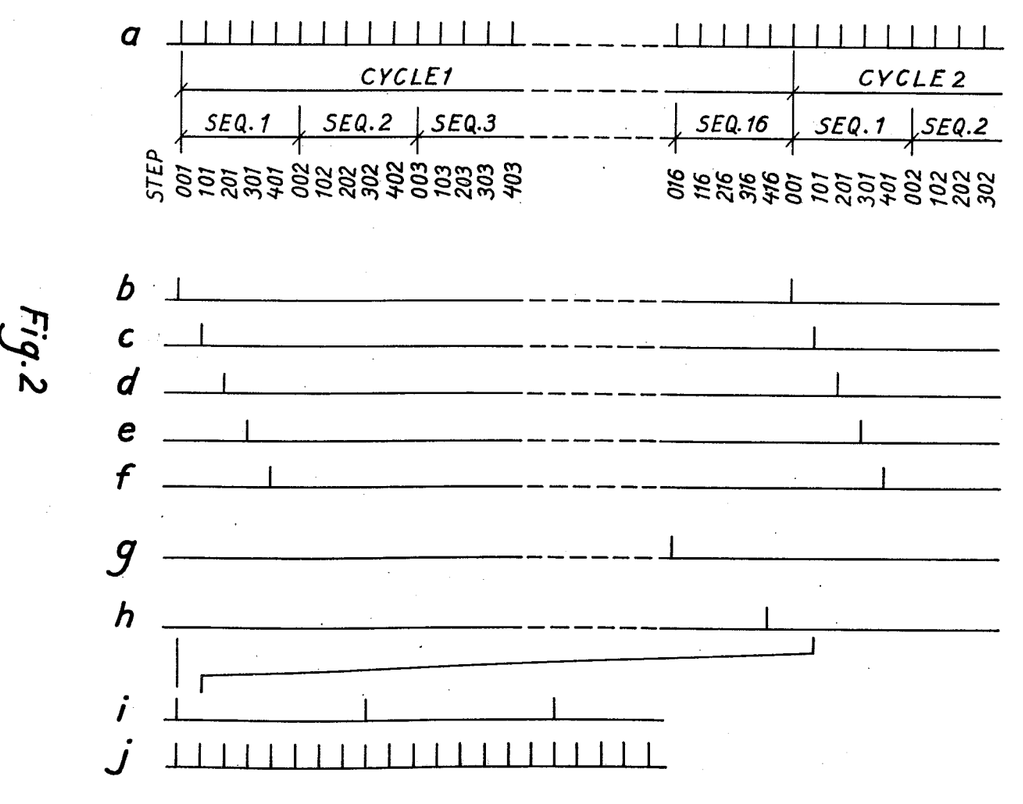
FIG. 2 shows a number of timing diagrams for illustration of the mode of operation of the transit exchange.

On the busses MUB and DEB the data signals are transferred which are received and sent, respectively, via equipments LU in the form of sampling and indication values, respectively, in a time sequence determined by an address counter ADR and with a density determined by a clock or timing generator TG. This density decides the accuracy with which the changes of state of the data signals can be determined and must thus be selected on the basis of the allowed time distortion caused by the transit exchange at the highest transmission rate. At, for example, a density corresponding to a sampling and indication frequency on the busses of 2 MHz the time distortion of 300 bauds will be slightly less than 1%. See FIG. 2, lines $a$, $c$, and $j$.

Interconnection of a calling terminal equipment, the A subscriber, with the desired other terminal equipment, the B subscriber takes place in a conventional way with the aid of a central control equipment SU comprising a control processor SD, a switch memory KM, a switch logic KL, an address counter ADR and a timing generator TG. The connecting and disconnecting procedure does not constitute a part of the invention, but will be briefly described in order to facilitate an understanding of the idea of the invention. The switch logic KL comprises five subunits MBL, TRL, ARL, SBL and UKL, and has as its object to process information, relating to the various connections, stored in the corresponding subunits MBM, TRM, ARM, SBM and UKM of the switch memory KM, as will be described in greater detail. Switching of the data signals from the incoming bus MUB to the outgoing bus DEB takes place via an encoding device KA consisting of a flank encoder memory FKM and a flank encoder logic FKL, with the aid of which incoming sampling values are reformed into code words, an intermediate memory FM, consisting of a buffer memory BM and an output buffer UB for intermediate storage of the bits in said code words, and a decoding device AA, consisting of a decoder memory AKM and a decoder logic AKL, with the aid of which the code words are converted into indication values. The functions of these devices will appear from the specification.

Each memory field in the switch memory, as also in the flank encoder memory, the buffer memory and decoder memory, has 64 memory positions corresponding to each of the 64 line equipments, and these positions are addressed at the same time as the respective line equipment obtains access to the busses MUB and DEB for writing into the flank encoder memory and for read-out from the decoder memory of associated sampling and indication values respectively. The addressing takes place cyclically, and each addressing cycle, in order to facilitate the read-out from the intermediate memory to the decoding device, is divided into 16 sequences of five steps each. During the first of the five steps there are transferred from the buffer memory BM to the output buffer UB four indication values, each relating to a line equipment in its respective 100-line group, e.g. equipments LU 101, LU 201, LU 301 and LU 401. During the other four steps in the same sequence these four indication values are transferred from buffer UB to corresponding positions in the decoder memory AKM, at the same time as said line equipments are addressed, the sampling and indication values being transferred from and to them, respectively, on busses MUB and DEB. This is illustrated on lines b – f in FIG. 2.

When the A subscriber's terminal, e.g. terminal T 101, is in the rest condition, the sampling values occurring on bus MUB during addressing step No. 101 represent binary zero (0). When a call is made, the state changes to binary one (1), whereupon the flank encoder logic FKL is activated and stores information concerning the event in position 101 in the flank encoder memory FKM. The time of the event is compared with the period of a clock signal delivered from the timing generator TG, the frequency of which is lower than the sampling frequency, e.g. one-eight of it, e.g. by counting the number of sampling values which can be received during the current period of the clock signal up to the time in question. The result of this operation is expressed in a code word comprising, for example, four binary bits, one of which indicates that a change of state has occurred from 0 to 1 and three indicate the time position of the change, and this code word is transferred bit by bit and in synchronism with the clock signal to the logic unit MBL, which writes the state "1" into the A subscriber's memory position in the receive buffer MBM. After this code word, 1 indications are transferred with the same timing as long as this state is indicated by the sampling pulses, and in the receiver buffer a new 1 value is stored at regular intervals, e.g. every sixth clock signal, which is assumed to correspond to the length of a unit interval of received characters during the signalling phase. In the receive buffer eleven element values are stored corresponding to the length of a signalling character, and if all are 1, a call indication is transferred to the logic unit TRL for updating of the A subscriber's memory position in the state register TRM at the same time as the latter's address is written into the corresponding position in the address register memory ARM. An acknowledgement of the call, independent of the control processor, also takes place through the changing of the output data to the subscriber from 0 to 1 by writing in the buffer memory BM in the manner described later.

The call indication is also transferred to the control processor SD, which identifies the A subscriber by means of the information in the address register. If the control processor is prepared to receive selection information from this subscriber, this must be signalled to the latter with a given combination of characters, e.g. GA (Go Ahead). This is done in the manner that each character, one at a time, is written into the A subscriber's position in the send buffer memory SBM, from which it is fetched, element by element, by the encoder logic UKL and stored in the associated memory UKM. Thence a serial transfer takes place to the A subscriber's position in the buffer memory BM of indication pulses which in binary form describe the transitions between the binary states in the respective characters, on the same principles as in the encoding device KA, after which, via the output buffer UB, they are transferred to the decoder device AA and stored in the decoder memory AKM. With the guidance of the binary information the decoder logic AKL forms new indication pulses which, through their value and time position, indicate the changes of state in the respective character and which are fed out on bus DEB and, in the A subscriber's time slot, via the demultiplexor DEX 1 to line equipment LU 101. Here, with the aid of the regeneration device RA 101, the indication values are composed into character elements which are transmitted one line L 101. After both characters, GA, have been transmitted, the control processor marks in the state register that this phase of the procedure has been completed.

The A subscriber is now expected to send selection information in the form of a specific number of data characters identifying a B subscriber (or a special service) within a specific time. If this transmission does not take place, the control processor SD initiates clearing of the A subscriber by restoring the output data to 0 and restoring the subscriber's memory word in the switching memory. If, on the other hand, selection information arrives, the characters are composed, as previously described, in the receive buffer, whence they are fetched, one at a time, by the control processor. When the necessary number of characters has been received for identification of the B subscriber, the control processor enters the corresponding position in the state register and investigates whether the subscriber is accessible. If not, notification of the fact is sent in the form of a number of characters, a so-called service signal, after which the A subscriber is cleared. If, on the other hand, the B subscriber is accessible, the control processor writes the call state into the state register, after which the output data in the B subscriber's memory position in BM, e.g. No. 416, are changed from 0 to 1, implying a call signal to the B subscriber's terminal T 416. During the first addressing step in the sequence during which line equipment LU 416 is addressed, i.e. during step 016, the indication values of the call signal are transferred to the output buffer from which, during addressing step 416, they are transferred to the decoder. As before, indication pulses are here formed which, via bus DEB and demultiplexor DEX 4, are delivered to line equipment LU 416 for composition into a continuous signal in the regenerative device RA 416.

When answering, terminal T 416 executes a shift from 0 to 1 in the direction towards the transit exchange, which is notified to the control processor via the receive buffer. The control processor writes a connect-through signal CT into the memory positions of both subscribers in the send buffer SBM, and when the signal has been transmitted, the fact is marked in the state register TRM at the same time as the information in the address register ARM is changed. Hitherto each subscriber's memory position in the address register has addressed its own line equipment but, on connect-through, these addresses are reversed. The through-connection also has the result that the binary indications which represent the code words formed by the encoding device KA are transferred directly to the encoder memory UKM. The receive buffer MBM, however, continues to receive all indications in order to be able to detect a clearing signal from either the A or B subscriber. The reversal of the addresses in the address register has the result that the indication values read out of the encoder memory in the A subscriber's memory position can be written into the B subscriber's memory position in the buffer memory BM, and vice versa. Through-connection thus takes place through a change of time slots during the transfer from switching memory KM to buffer memory BM.

The request for clearing consists in the continuous transmission of 0 by either terminal. When 0 has been written into the receive buffer in all of its eleven element positions, the fact is noted in the state register, while the control processor identifies the associated addresses. Both terminals are then cleared and the associated memory positions in the address register are zeroed.

The connection and disconnection process described above has been described merely in order to give a more complete picture of the mode of operation of the transit exchanges and, as earlier noted, does not constitute a part of the invention. The computer may be a real time computer of any known design of the type used in telecommunication plants.

The basic principle of the invention can very well be explained by describing a stationary state when two subscribers are connected to one another, without taking into consideration how the connection was set up.

Figure 3:
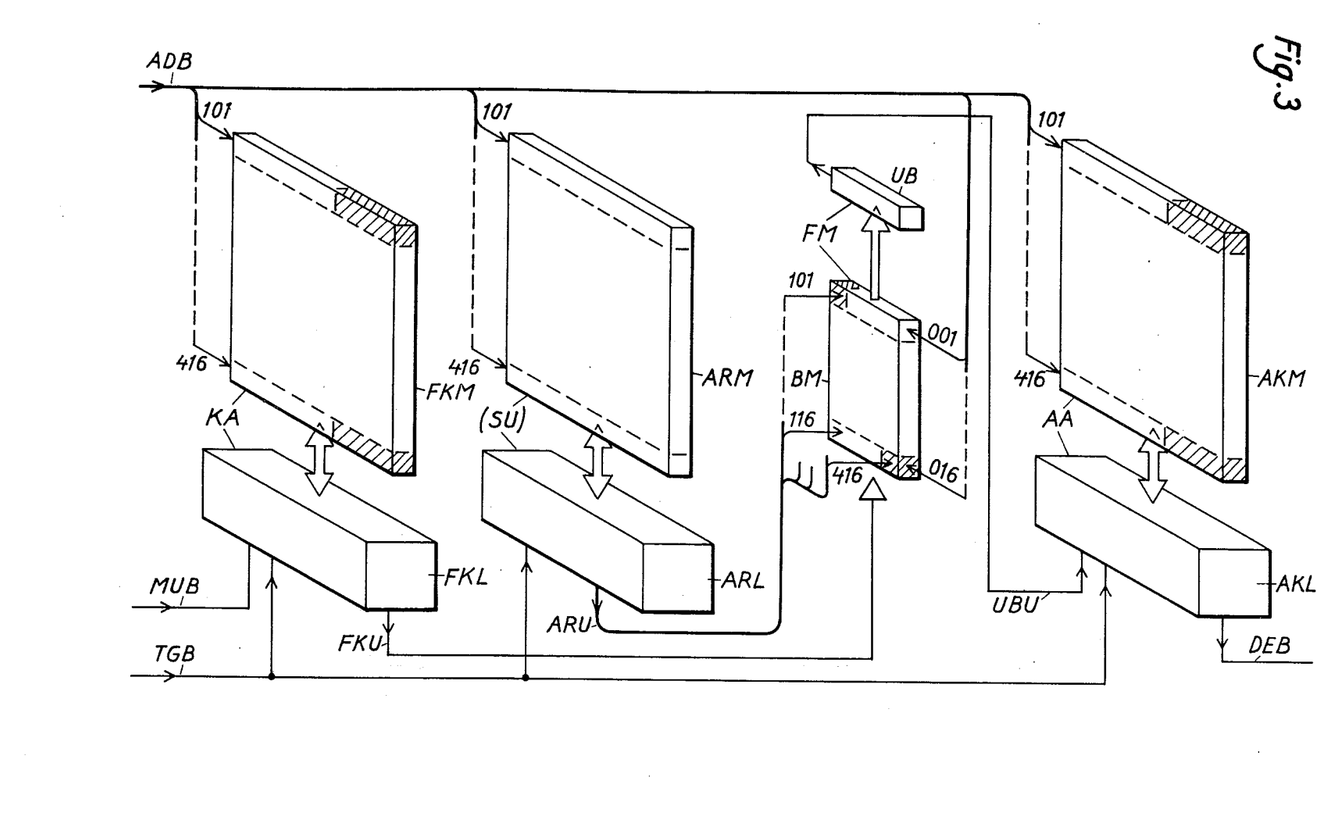
FIG. 3 is a block diagram of the device according to the invention.
Figure 4:
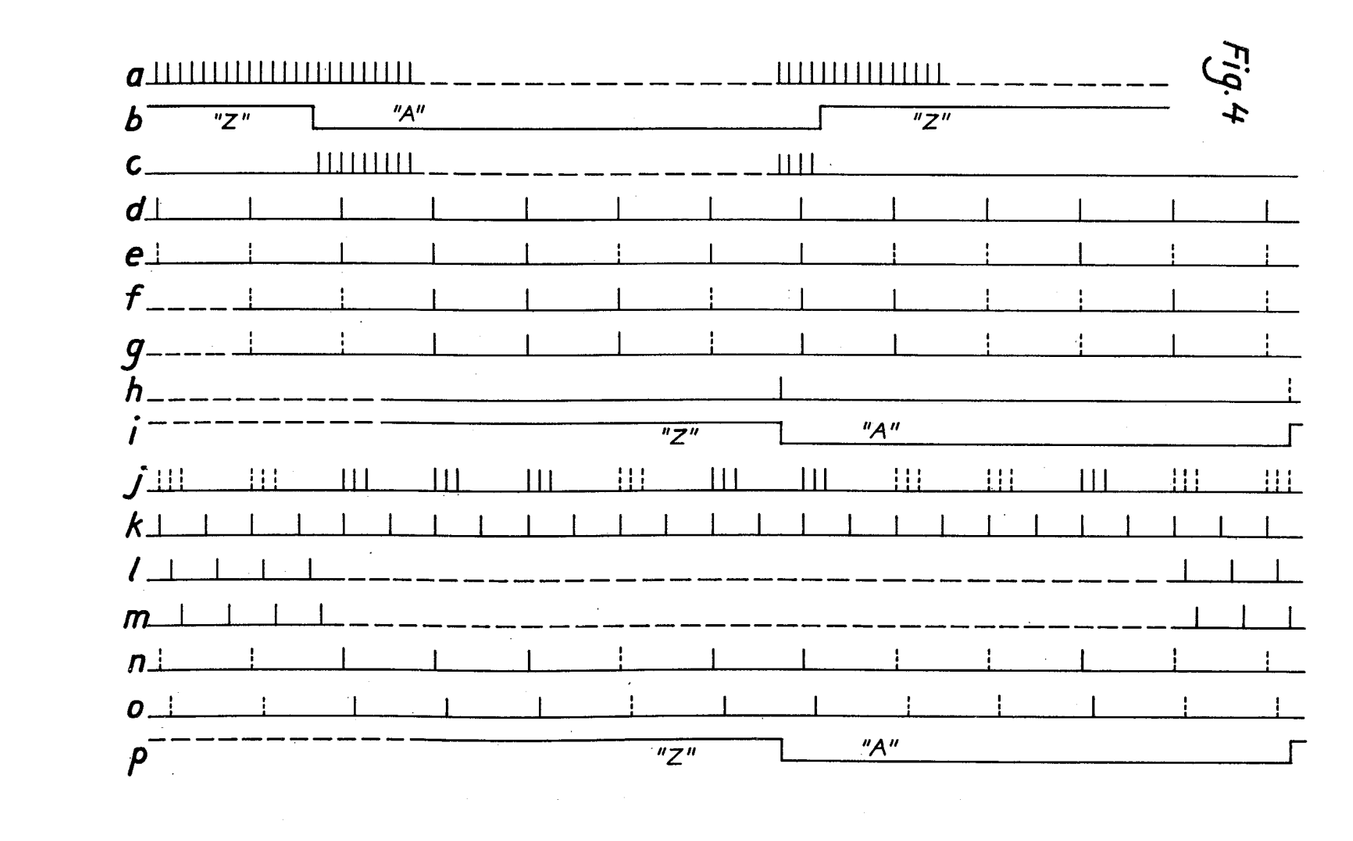
FIG. 4 shows a number of timing diagrams which illustrate the function of the device in FIG. 3, FIGS. 5 and 6 show how two functional blocks essential for the transit exchange can be realized.

FIGS. 3 and 4 show in simplified form the operation which is of interest for describing a stationary state, information in the form of asynchronous data signals with unknown rate, but maximized to 300 bauds, and with unknown character structure, being exchanged between two connected subscribers. Thus FIG. 3 shows the encoding device KA with flank encoder memory FKM and flank encoder logic FKL, the address register memory ARM with associated address register logic ARL forming part of the control equipment SU, and the intermediate memory containing the buffer memory BM and output buffer UB, and the decoding device AA with decoder memory AKM and decoder logic AKL.

The A and B subscribers are represented by the memory addresses 101 and 416. Corresponding to each address there is a memory word in each of the memory fields FKM, ARM, AKM, and a memory bit in the buffer memory BM. The memory bits in BM are arranged in 4-bit memory words which can be accessed via special address inputs, in the example 001 and 016.

Bus ADB is in connection with the address counter ADR shown in FIG. 1, while lead TGB is connected to the timing generator TG. Busses MUB and DEB are in connection with the multiplexor and demultiplexor units respectively, as shown in FIG. 1.

The timing diagram in FIG. 4 shows the course of events during the transfer of data signals from A to B subscriber. The pulse train on line a, which corresponds to line j in FIG. 2, indicates the times when the address counter is in position 101, i.e. when both the A subscriber's memory word is addressed in memory fields FKM, ARM and AKM and the A subscriber's line equipment LU 101 is addressed in the multiplexor unit MUX 1. This addressing step recurs, according to the example, at the repetition frequency 48 times per unit element of the signalling characters, i.e. the characters transferred during the setting-up phase, which implies that sampling values relating to data signals arriving from the A subscriber are transferred at this frequency to the flank encoder logic FKL via bus MUB. On line b are shown data signals arriving from line L 101, where the first switching from Z state to A state is followed by a signal element of a length corresponding, for example, to 44 sampling intervals. The sampling values transferred on bus MUB follow the changes of state of the received data signals so that, as shown on line c, the flank encoder logic FKL is supplied with positive pulses during the intervals when received data signals have A state. The first of these positive pulses is compared in time with the clock signal shown on line d, which is received from the timing generator TG via bus TGB. One period of this clock signal is equal, according to the example, to eight sampling intervals and thus it is possible to indicate by means of three binary bits the sampling interval within the clock signal period during which the first positive sampling pulse occurred.

Figure 5:
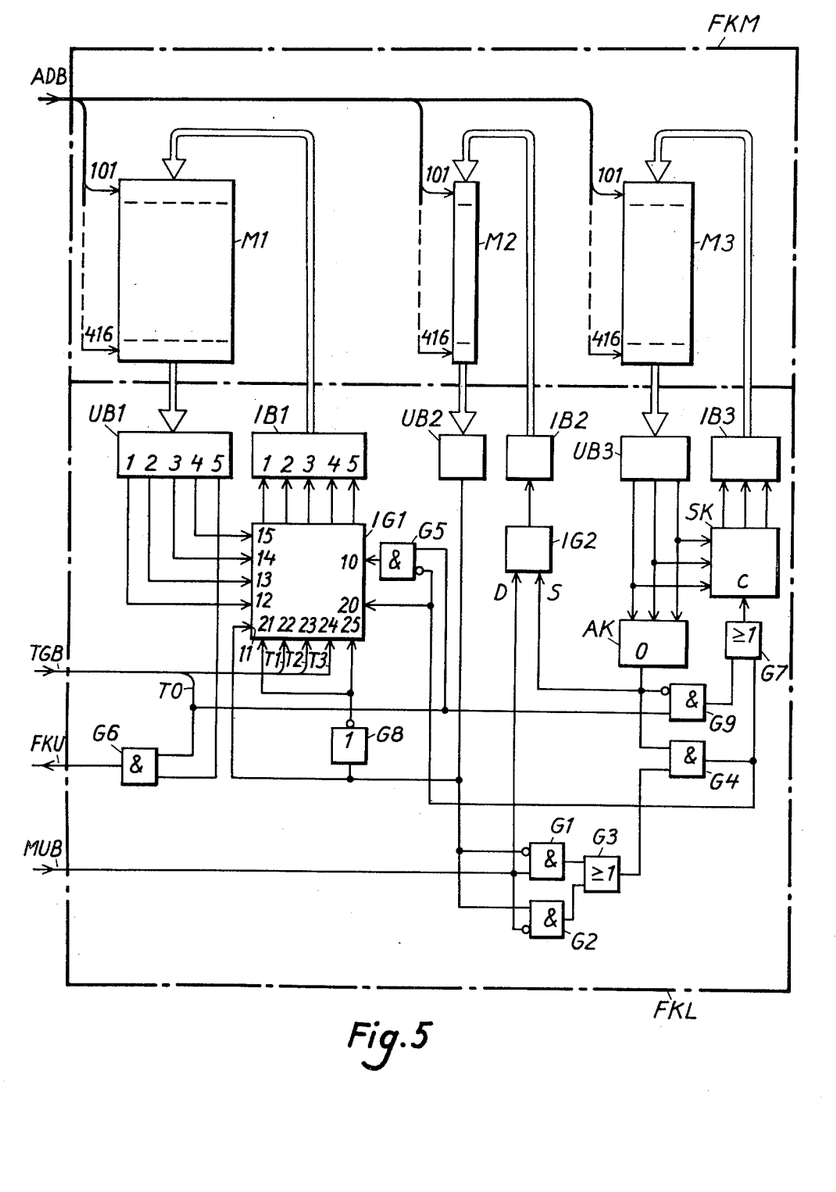

An encoding device working on this principle may be designed, for example, as shown in FIG. 5, in which the flank encoder memory FMK consist of three parts, M 1, M 2 and M 3, which interwork with their respective read-out buffers UB 1, UB2, UB 3 and their respective write-in buffers IB 1, IB 2, IB 3, forming part of the flank encoder logic FKL. Logic FKL also contains two write-in gates IG 1, IG 2, a decoder AK, a summation circuit SK, and nine gate circuits G 1 – G 9. Read-out and write-in in the three memory units takes place, as earlier described, on the basis of the address information arriving on bus ADB. On every addressing occasion a read-out first takes place of data to the read-out buffers, thereafter processing of these data in the logic circuits under control of the signals which at the same time arrive on busses MUB and TGB from the multiplexor units and timing generator respectively, after which new data are written into the memory unit. Via output FKU indication signals are delivered to the control equipment SU shown in FIG. 1.

The memory unit M 1 has five bit positions which are used for storage of the code words to be transmitted on output FKU. For write-in in M 1 data are delivered to the write-in buffer via the write-in gate IG 1 either via inputs 11 – 15 or via inputs 21 – 25 depending on the control conditions on inputs 10 and 20 respectively. The memory unit M 2 has one bit position in which is stored the present state of the received sampling pulses. New state information is delivered to the write-in buffer IB 2 via input D on input gate IG 2 in dependence on the control condition on input S. The memory unit M3 has three bit positions for storage of a number formed in the summation circuit SK, which advances by one every time the control input C receives a 1 signal until the number four is reached, after which it returns to 0. The decoder AK has an output 0 which assumes the state 1 when the read-out buffer UB 3 contains the number 0.

The AND gates G 1, G 2 together with the OR gate G 3 form an EXCLUSIVE-OR circuit by means of which every received sampling value is compared with the value simultaneously existing in read-out buffer UB 2. In the case of a difference, 1 state is received on the output from G 3. In the case of similarity 0 is received from G 3, which inhibits the AND gate G 4 and the output of the latter assume 0 state. One of the activation conditions of the AND gate G 5 is thus fulfilled at the same time as the control input 20 to the read-in gate IG 1 is inhibited. The control input 10 to IG 1 is activated via G 5 if a 1 pulse is simultaneously received on path T 0 from the timing generator bus TGB, which occurs for every eight addressing cycle. On activation of control input 10 data on inputs 10 – 15 are gated over to inputs 1 – 5 on the write-in buffer IB 1, which implies that data which have been read out to the bit positions 1– 4 in the read-out buffer UB 1 are written into the bit positions 2 – 5 in IB 1, at the same time as the information in position 5 in UB 1 is fed out via the AND gate G 6 to the output FKU and a new value is fetched from the read-out buffer UB 2 for writing into position 1 in the write-in buffer IB 1. The complex M 1, UB 1, IG 1, IB 1 thus works as a shift register which for every eight addressing cycle reads in a new value in its first position and feeds out a value from its fifth position as long as control input 10 is activated.

In the event of dissimilarity between the values from bus MUB and buffer UB 2 one input to the AND gate G 4 will have 1 state. If at the same time the decoder AK indicates the number 0, gate G 4 is activated, as a result of which the control input C to the summation circuit SK will have 1 state via the OR gate G 7 and the control input 10 to the write-in gate IG 1 will be inhibited, while instead the control input 20 will be activated. The write-in gate IG 2 will also be activated through 1 state on input S. SK adds 1 to the number read out from the read-out buffer UB 3 and transfers the result, in this case accordingly 1, to the write-in buffer IB 3. The read-in gate IG 1 at the same time gates data over from inputs 21 – 25 on gate IG 1 to inputs 1 – 5 on the write-in buffer IB 1 and new state information is delivered to the write-in buffer IB 2 via input D on gate IG 2. The data information read in via IG 1 corresponds to the code word to be fed out on output FKU for description of the change of state indicated by sampling pulses of bus MUB. The code word starts with an indication that a change of state has occurred, which is achieved in the manner that the previous state value which was fetched from the read-out buffer UB 2 is inverted in circuit G 8 and thereafter delivered to input 25 on the write-in gate IG 1. The following three bits in the code word notify the time at which the change of state of the sampling pulses occurred and are obtained on path T 1, T 2, T 3 from the timing generator bus TGB to inputs 22 – 24 on IG 1. After this information the indication of state is repeated, so that input 21 on IG 1 receives the same information as input 25.

According to the above, the number 1 was written into the write-in buffer IB 3. The next time the same memory position is addressed, therefore, the read-out buffer UB 3 will contain the value 1, so that output 0 from the decoder AK assumes the state 0, which constitutes an activation condition for the AND gate G 9 but inhibition condition for the AND gate G 4 and read-in gate IG 2. The second activation condition for gate G 9 is obtained from path T 0 on the timing generator bus TGB and occurs, as noted above, for every eighth addressing cycle. On this occasion, accordingly, input C receives 1 state on the summation circuit SK, the number being advanced to 2, at the same time as control input 10 on the read in gate IG 1 is activated and the latter executes a shift operation in the manner earlier described. In the meantime the read-in gate IG 2 is blocked through the 0 state on input S, so that the state information is definitely kept unchanged during this phase. After four shift operations the counting cycle is completed and the number 0 has been written into the write-in buffer IG 3 in order to indicate that the code word read in via inputs 21 – 25 has now been shifted so far that, on the next read-out from read-out buffer UB 1, all positions 1 – 5 will contain solely state information. The essential part of the code word has thus been fed out via the AND gate G 6 to the output FKU, and the encoding device can be allowed to register a new change of state of incoming sampling signals.

According to the above, therefore, the encoding device KA forms a code word which, apart from the three time-determined bits, is assumed to contain a state-indicating bit, and this word is stored in the A subscriber's memory word, address 101, in the flank encoder memory FKM. This information is symbolized in FIG. 3 by the upper shaded portion of memory FKM. For data signals incoming from the B subscriber, information is stored correspondingly in address 416, i.e. the lower shaded portion. In synchronism with the signal on line d there are delivered on output FKU indication signals in the form of 1 pulses, the fully drawn pulses on line e in FIG. 4, and 0 pulses, the dotted pulses, in correspondance with the code word stored in FKM. Thus the first fully drawn pulse on line e) indicates that switch-over has taken place from Z to A state, while the following three pulses form the binary number 110, which expresses that the switch-over occurred during the sixth sampling interval within the preceding period of the clock signal. The following two pulses constitute fillers and contain state information, indication value 1. The indication signals are delivered to the buffer memory BM and, on writing into the latter, the indication values representing the A subscriber's data signals are placed in the B subscriber's memory cell and vice versa. For this purpose address information is used which has been stored in the address register memory ARM during the setting-up phase, during which selection information has been received from the A subscriber and analysed by the control processor SD shown in FIG. 1. The latter has written into memory ARM the B subscriber's address, 416, in the A subscriber's memory position, 101, and the A subscriber's address, 101, in the B subscriber's memory position, 416. In synchronism with the signal on line d the buffer memory thus fetches via output ARU from the address register logic unit ARL information to identify the memory cell in BM to which the indication value simultaneously received from the flank encoder logic FKL is to be delivered, acccording to the example to address 416.

As earlier described, the addressing from the address counter takes place cyclically, each addressing cycle comprising 16 sequences of 5 steps each. During four steps one line in each of four groups of 16 lines each is addressed successively, while during the immediately preceding step a read-out took place from the buffer memory BM to the output buffer UB serving as parallel-series converter of indication values to the four outgoing lines which are being addressed during the aforesaid four steps. As indicated in FIG. 3, the word in the buffer memory BM containing memory cells 101, 201, 301 and 401 is addressed 001 and the word containing cells 116 – 416 is addressed 016. On line $f$ in FIG. 4 it is shown by means of fully drawn pulses how the new indication value in memory cell 416 is transferred to the output buffer during address step 016 and, during the first following step 416, via output UBU, is transferred to the decoding device AA as shown on line $g$. The time relation between addressing steps 101, 016 and 416 will be seen from FIG. 2, lines $c$, $g$ and $h$.

The function of the decoding device is, on the basis of the binary information in the indication values transferred from buffer UB, to form a new indication signal, according to line $h$ in FIG. 4, which is fed out on bus DEB in the time position indicated by the code word contained in the indication values.

In the same way as described for the switch-over from Z to A state, the next switch-over back to Z state is dealt with. According to FIG. 4, line $c$, no sampling pulses occur after this switch-over, which implies that the polarity during the following interval will be indicated by the indication value 0, as shown on line $e$. The time indication for the switch-over is 010, which means that the switch-over occurred during the second sampling interval within the just completed period of the clock signal on line $d$. The indication values are forwarded in the same way as earlier described and give rise to an indication signal on bus DEB as shown by the dotted pulse on line $h$. On line $i$ are shown the regenerated data signals as they are transmitted to the B subscriber after reconstitution in the line equipment by means of the indication signals on line $h$. The regeneration device RA consists of a bistable flip-flop which is set to one of its two positions in dependence on the values of the indication signals. The accuracy of the reproduction for the shown data pulse (A state) is in this example slightly more than 2% of the pulse length. For greater accuracy a higher sampling frequency is required, and a corresponding increase of the length of the code word.

Figure 6:
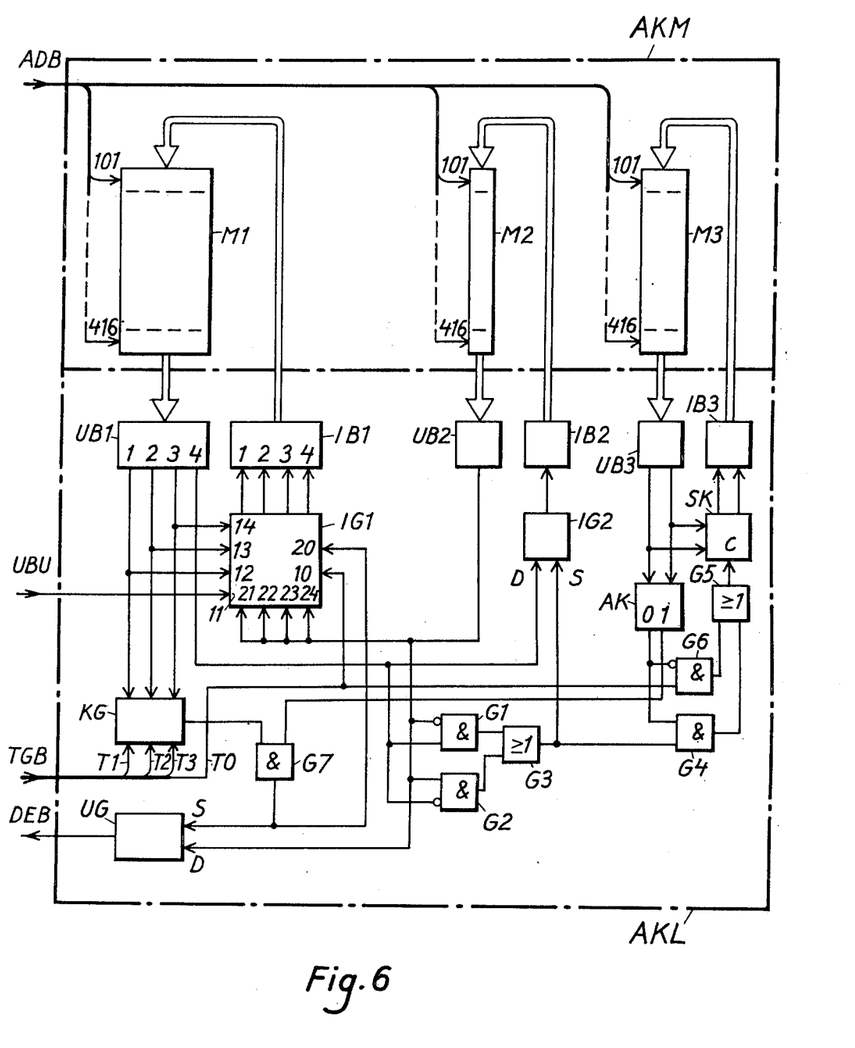

The above mentioned decoding device AA may, for example, be designed as in FIG. 6, in which the decoder memory AKM consists of three units, M 1, M 2 and M 3, each of which interworks with its read-out buffer UB 1, UB 2, UB 3, and its write-in buffer IB 1, IB 2, IB 3, forming part of the decoder logic AKL. AKL also contains two write-in gates IG 1, IG 2, a decoder AK, a summation circuit SK, a comparator gate KG, a read-out gate, UG and seven gate circuits G 1 – G 7. Read-out and write-in in the three units of the memory take place, as earlier described, with the guidance of the address information arriving on bus ADB. On each addressing occasion a readout first takes place of data to the read-out buffers, thereafter processing of these data in the logic circuits under the control of the signals which at the same time arrive on lines UBU and TGB from the output buffer and timing generator respectively, after which new data are written into the units of the memory. Via line DEB indication signals are delivered to the demultiplexor units shown in FIG. 1.

The memory unit M 1 has four bit positions which are used for storage of the code word arriving on line UBU to input 11 on the write-in gate IG 1. With 1 state on input 10 to IG 1 the information on input 11 is gated over to input 1 on the write-in buffer IB 1, at the same time as the information on inputs 12 – 14 from outputs 1 – 3 on the write-out buffer UB 1 is gated over to inputs 2 – 4 on IB 1. The input 10 on UG 1 is supplied with a 1 pulse for each eighth addressing cycle from path T 0 on the timing generator bus TGB, and for each pulse accordingly a one-increment shift-in is achieved of the indication values which arrive on line UBU until finally, after four shifts, they become accessible on output 4 from read-out buffer UB 1. With 1 state on input 20 to the write-in gate IG 1 the information delivered to inputs 21 – 24 from the output buffer UB 2 is gated over to inputs 1 – 4 on the write-in buffer IB 1, so that all bit positions receive the same information. The memory unit M 2 has one bit position in which is stored the state information in the last received code word. The write-in in write-in buffer IB 2 is done via input D to the write-in gate IG 2 in dependence on the control condition on input S. The memory unit M 3 has 2 bit positions for storage of a number formed in a summation circuit SK by addition of 1 every time the control input C is supplied with 1 signal until the number 3 is attained, after which it returns to 0. The decoder AK has two outputs, 0 and 1, which assume the state 1 when the read-out buffer UB 3 contains the number 0 and 1 respectively. By means of the comparator gate KG the binary value of the three bits read out from inputs 1 – 3 on the read-out buffer UB 1 is compared with the binary value of the three clock signals T 1, T 2, T 3 from the timing generator bus TGB. In the event of similarlity between these binary values a 1 signal is delivered on the output from KG. The read-out gate UG has the function of transferring to the demultiplexor bus DEB the state value supplied to input D from the read-out buffer UB 2 when the control input S is supplied with a 1 signal.

The AND gates G 1, G 2 together with the OR gate G 3 form an EXCLUSIVE-OR circuit with which a comparison is made between the value read out from output 4 on the read-out buffer UB 1 and the value read out from the read-out buffer UB 2. In the event of dissimilarity 1 state is obtained on the output from G 3, which constitutes an activation condition for one input on the AND gate G 4 and input S on the read-in gate IG 2. If at the same time the number 0 is read out to the decoder AK, 1 state is obtained also on the other input on G 4, so that input C on the summation circuit SK receives 1 pulse via the OR gate G 5. Summation circuit SK adds 1 to the number read out from the read-out buffer UB 3 and transfers the result, in this case accordingly 1, to write-in buffer IB 3 at the same time as new state information is delivered to the write-in buffer IB 2 via input D on the write-in gate IG 2 from output 4 on buffer UB 1. During the subsequent addressing cycle 0 state is obtained from output 0 on the decoder AK, which constitutes one activation condition for the AND gate G 6, and 1 state from output 1 on decoder AK, which constitutes one activation condition for the AND gate G 7.

The fact that the values read out from buffer UB 1, output 4, and buffer UB 2 differed signifies that a complete code word comprising a first bit for state indication and three bits for indication of the time for a change of state now exist in the read-out buffer UB 1. On the addressing occasion when the binary number formed by the clock signals T 1 – T 3 coincides with the binary number read out from the outputs 1–3 on buffer UB 1, gate G 7 obtains its second activation condition from the comparator gate KG, which results in the delivery of 1 state to input 20 on the read-in gate IG 1 and input S on the read-out gate UG. The new state value is then gated via inputs 21 – 24 on gate IG 1 over to inputs 1 – 4 on the write-in buffer IB 1 and is at the same time gated out on bus DEB via input D on gate UG.

The next 1 pulse on path T 0 from the timing generator bus TGB is conducted through gates G 6, G 5 to input C on the summation circuit SK, which advances the number read out from buffer UB 3 to 2, so that at the next read-out output 1 from the decoder AK reassumes 0 state. Output 0 still has 0 state, so that stepping continues for every T 0 pulse. After the number 3 a return is made to 0 and the decoding device is then prepared to register a new change of state of the incoming indication values.

Figure 7:
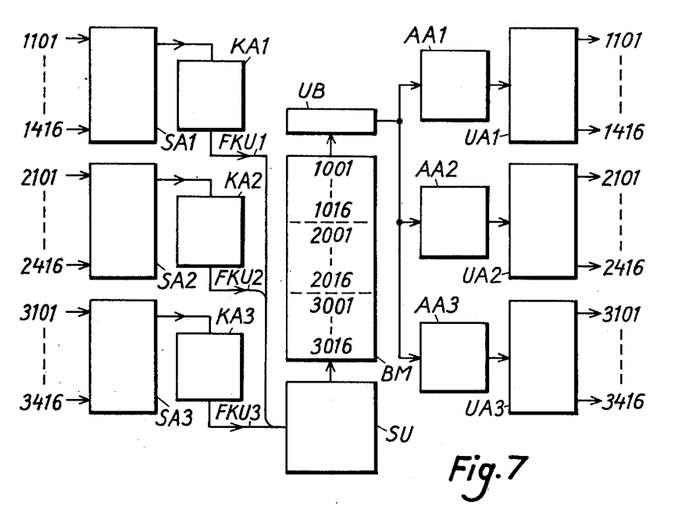
FIGS. 7 and 8 show two alternatives for extension of the capacity of a transit exchange.

As appears from the preceding account, the processing of the indication signals in the control equipment SU and intermediate memory FM takes place at a speed which is considerably lower than that at which the other units work; in the example the speeds differ by a factor of 8. This fact can be utilized for extending the capacity of a transit exchange by allowing up to eight sampling and encoding devices and decoding and read-out devices, each with its line group, to interwork with a common extended buffer memory, while retaining a common control equipment with a correspondingly extended switch memory. The switch logic of the control equipment can then work on the time division principle, in which case, according to FIG. 7, for example three sampling devices SA 1 – SA 3, each for 64 lines numbered L 1101 – 1416, L 2101 – 2416 and L 3101 – 3416, and three corresponding read-out devices UA 1 - UA 3 and the associated encoding devices KA 1 – KA 3 and decoding devices AA 1 – AA 3 are served successively in a cyclical pattern. According to an example which will be explained with reference to lines *j* to *p* in FIG. 4, the indication signals relating, for example, to line L 1101 are made accessible on the output from the encoding device KA 1 during three successive addressing steps, 1101, as illustrated on line *j*. The said time division principle is illustrated by means of the three lines *k, l, m*, which show the times at which the first memory word in each encoding device is processed, i.e. addresses 1101, 1201 and 3101. Every time coincidence occurs between the pulses on line *j* and *k*, as shown by the pulses on line *n*, a transfer of the indication value takes place from output FKU 1 on the encoding device KA 1 to the buffer memory BM where, according to the example, it is placed in memory cell 2416 forming part of a memory area associated with the line group of the second read-out device UA 2.

The write-in in the buffer memory BM takes place in accordance with the address information in the address register memory, while the transfer to the output buffer UB takes place cyclically and successively for the respective line groups in such a way that the memory words in the respective groups, e.g. 2001 – 2016, are transferred in one sequence so coordinated that the corresponding memory words are addressed in the decoding device AA 2. This transfer is shown on line *o* in FIG. 4, and on line *p* are shown the data signals transmitted on line L 2416.

Figure 8:
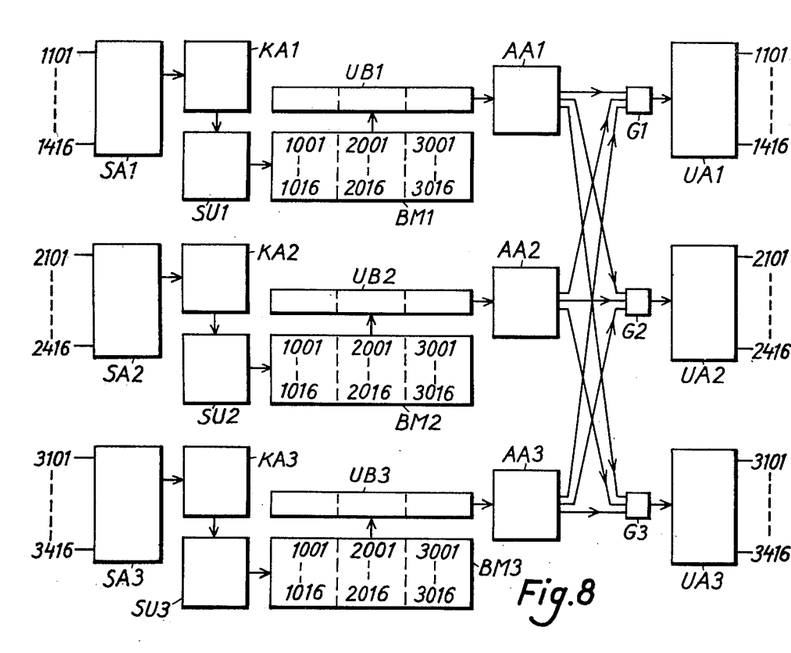

Another advantage of the invention is that it provides simple means for an extension to, in principle, eightfold capacity solely by increasing the capacity of the buffer memory and output buffer in a number of identical units of the type described in conjunction with FIGS. 1 – 4 and interconnecting these identical units with one another via simple OR circuits, e.g. G 1 – G 3 in FIG. 8, to produce a threefold capacity. This requires a prolongation of the memory words in all units in such manner that in each buffer memory there is arranged a memory cell not only for the addresses in its own unit, but also for the addresses in all other units. The read-out then takes place in parallel form from corresponding memory cells, while of course only one of the simultaneously addressed memory cells contains any information.

We claim:

1. In a transit exchange for the relaying of asynchronous data signals having an unknown character structure and data rate from sending terminal equipments to receiving terminal equipments with the aid of a control equipment, containing a computer, and a sampling means, common to a number of sending terminal equipments and arranged to work according to the time division multiplex principle, for sampling with the aid of sampling pulses the instantaneous values of the data signals received on each of a number of incoming lines from sending terminal equipments, and encoder means arranged to work synchronously with said sampling device, for encoding by means of successive processing of the sampling pulses whether the data signals have changed said value between two consecutive sampling pulses and, in correspondence therewith, for delivering an indication signal in the form of a code word having a specific number of binary bits which indicate the time position for the sampling pulse occurring after such change, the improvement comprising an intermediate memory means for storing the data bits serially in an addressed location assigned to the receiving terminal equipment, a decoding means connected to said intermediate memory for successively processing the binary bits to form indication signals which alter their value in accordance with the time position indicated by the code words, regeneration means assigned to receiving terminal equipments, and a read-out means arranged to work synchronously with said decoding means, for transferring the values of the indication signals cyclically from said decoding means to said regeneration means, and said regeneration means including means for forming from the values of the received indication signals data signals which change value in synchronism with the indication signals.

2. In the transit exchange according to claim 1 said intermediate memory means comprises a parallel-series converter means for receiving simultaneously a number of the binary bits relating to a corresponding number of the receiving terminal equipments and for transmitting said binary bits sequentially.

3. In the transit exchange according to claim 1, the intermediate memory means includes means for storing memory words containing a number of bit positions corresponding to the number of binary bits to be transferred simultaneously.

4. In the transit exchange according to claim 1, means for transferring the binary bits from said encoder means to said decoder means at a bit frequency which is a fraction of the sampling frequency.

5. In the transit exchange according to claim 1, means for transferring the binary bits at a bit frequency which is equal to the sampling frequency.

6. In the transit exchange according to claim 1, means for transferring the indication signals at a frequency equal to the instantaneous frequency at which the data signals alter in value.

7. In the transit exchange according to claim 1, a plurality of sampling and encoder means, similar to said sampling means and said encoder means, each having means for interworking with a group of the sending terminal equipments and each arranged to work at the sampling frequency, and a corresponding number of decoding and read-out means similar to said decoding means and said read-out means, each having means for interworking with an assigned area in said intermediate memory, so arranged that the storage and read-out of said binary bits in said intermediate memory takes place sequentially and successively for each said assigned area.

8. In the transit exchange according to claim 1, a plurality of sampling and means similar to said sampling means and said encoder means, each having means for interworking with a group of said sending terminal equipments and each arranged to work at the sampling frequency, and a corresponding number of decoding and read-out means similar to said decoding means and said read-out means, a plurality of intermediate memories similar to said intermediate memory, each of said read-out means having means for interworking with an assigned area in each of said intermediate memories, each of said intermediate memories being associated with each of said sampling and encoder means and each of said decoding means so arranged that the storage of the binary bits in each of said intermediate memories takes place in parallel with and independent of the storage in the rest of said intermediate memories, while said read-out takes place in parallel and is coordinated to take place simultaneously from all of said assigned areas which correspond to the same one of the read-out means and successively for each assigned area in each of said intermediate memories.

* * * * *